United States Patent [19]

Liaukus et al.

[11] 4,085,442

[45] Apr. 18, 1978

[54] DATA DISPLAY SYSTEM DESIGNED AS A MICROCONTROLLER

[75] Inventors: Sigitas Julius Liaukus, Huntington; Dixson Teh-Chao Jen, Monroe, both of Conn.

[73] Assignee: Bunker Ramo Corporation, Oak Brook, Ill.

[21] Appl. No.: 563,527

[22] Filed: Mar. 31, 1975

[51] Int. Cl.$^2$ ............................................. G06F 3/14
[52] U.S. Cl. ................................................. 364/900
[58] Field of Search ......................... 340/172.5; 444/1

[56] References Cited

U.S. PATENT DOCUMENTS

| | | | |
|---|---|---|---|
| 3,568,163 | 3/1971 | Osborne | 340/172.5 |
| 3,760,375 | 9/1973 | Irwin et al. | 340/172.5 |
| 3,778,775 | 12/1973 | Haring et al. | 340/172.5 |

*Primary Examiner*—Raulfe B. Zache
*Attorney, Agent, or Firm*—F. M. Arbuckle; Morris Liss

[57] ABSTRACT

A programmable read-only memory (PROM) provides a fixed stored microroutine to logic circuitry which controls the fetching of data from a memory to a variable number of video display units. The microroutine includes a small number of micro subroutines that are utilized to fetch the addresses in a separate main memory, where character data is to be found. Similarly, subroutines are provided for obtaining entry marker (cursor) addresses from the main memory. Additional subroutines are provided for indirectly addressing the main memory for the character data which undergoes encoding by a character generator that is capable of providing video information to eight channels.

18 Claims, 3 Drawing Figures

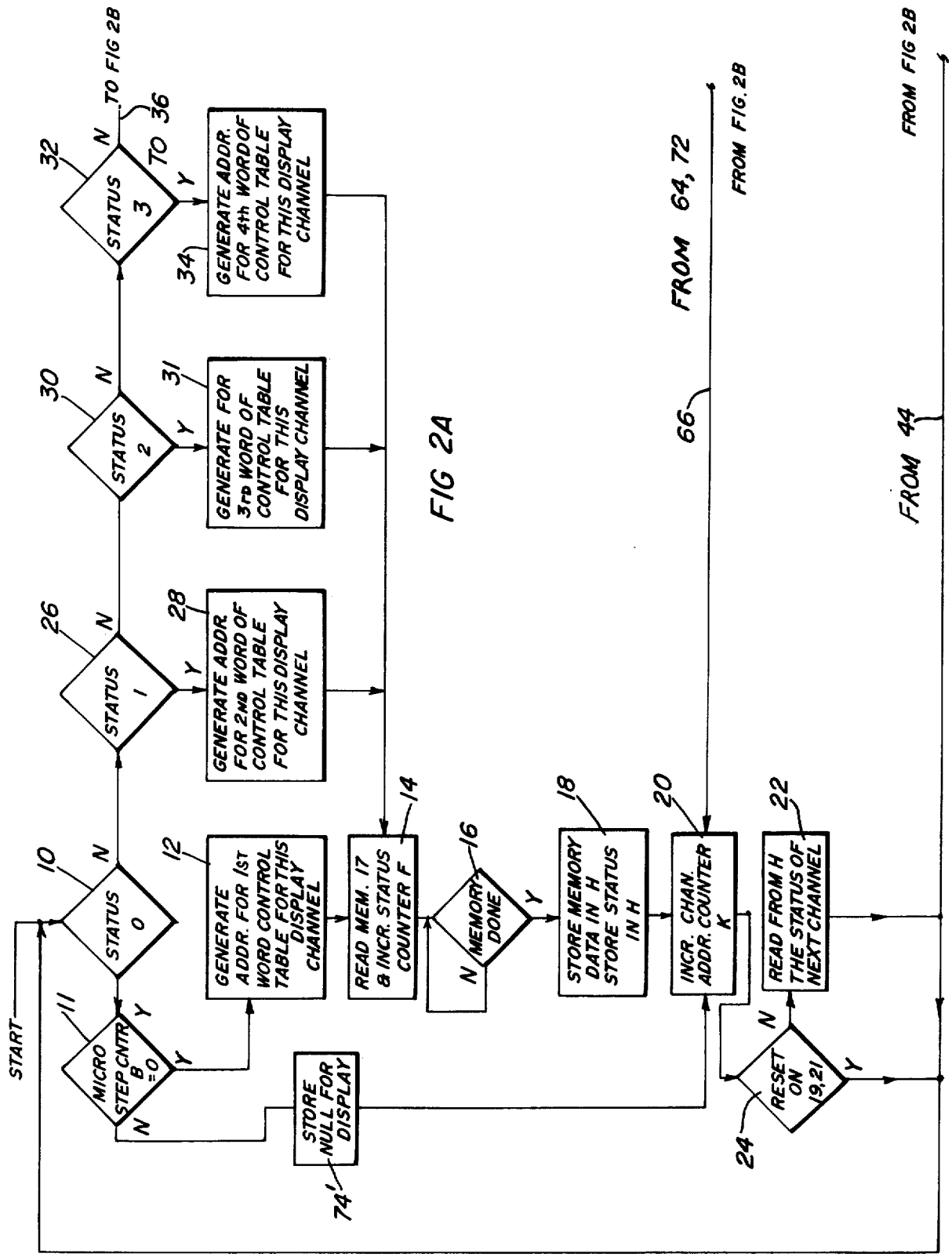

DATA DISPLAY SYSTEM DESIGNED AS A MICROCONTROLLER

FIELD OF THE INVENTION

The present invention relates to digital video data terminals, and more particularly to such a terminal that uses a fixed stored program that controls logic circuitry, which in turn manipulates data from a memory to a variable number of video display units.

BRIEF DESCRIPTION OF THE PRIOR ART

In the past, a wide variety of display terminals have utilized hard wire discrete logic to perform the controlling function between a memory containing data and CRT monitors. Typically, an auxiliary memory is utilized to store data from a main memory so that the main memory is not encumbered by requests made by the CRT terminals. In an alternate approach taken by the prior art, a single memory served the display terminals as well as other peripheral devices. Because the displays require a certain frequency of data circulation to maintain a video display, other peripheral devices were required to wait until the memory circulated to a desired point, before access could be made. As a result, other peripheral devices were slowed down in preference to the requirements of the displays. As a result of the problems encountered by the prior art approaches, rather large logic circuits had to be fabricated which resulted in substantial costs and debugging time. Also, systems were developed that were not optimized for time utilization.

BRIEF DESCRIPTION OF THE PRESENT INVENTION

The foregoing disadvantages of the prior art have been obviated by the present invention. Notably, the present invention utilizes advanced state of the art components including programmable read-only memories and random access memories, which are extremely fast. The resultant package of the present invention is a compact device which is economically produced, when compared to the prior art. The data display subsystem of the present invention interfaces with a memory that is utilized by remaining portions of a data handling system, other than the display subsystem. Accordingly, utilization of the memory is maximized by all portions of a large data handling system. The present invention is actually fabricated from commercially available IC chips that reduce the number of discrete components to a minimum. Thus, the reliability is maximized and debugging time is minimized. From a cost consideration, the assembly of the present invention is far less expensive than a comparable version would be with hard wire discrete logic components.

BRIEF DESCRIPTION OF THE FIGURES

FIGS. 2A and 2B are flow diagrams of the microroutine utilized by the present data display subsystem.

DETAILED DESCRIPTION OF THE INVENTION

Figure 1:
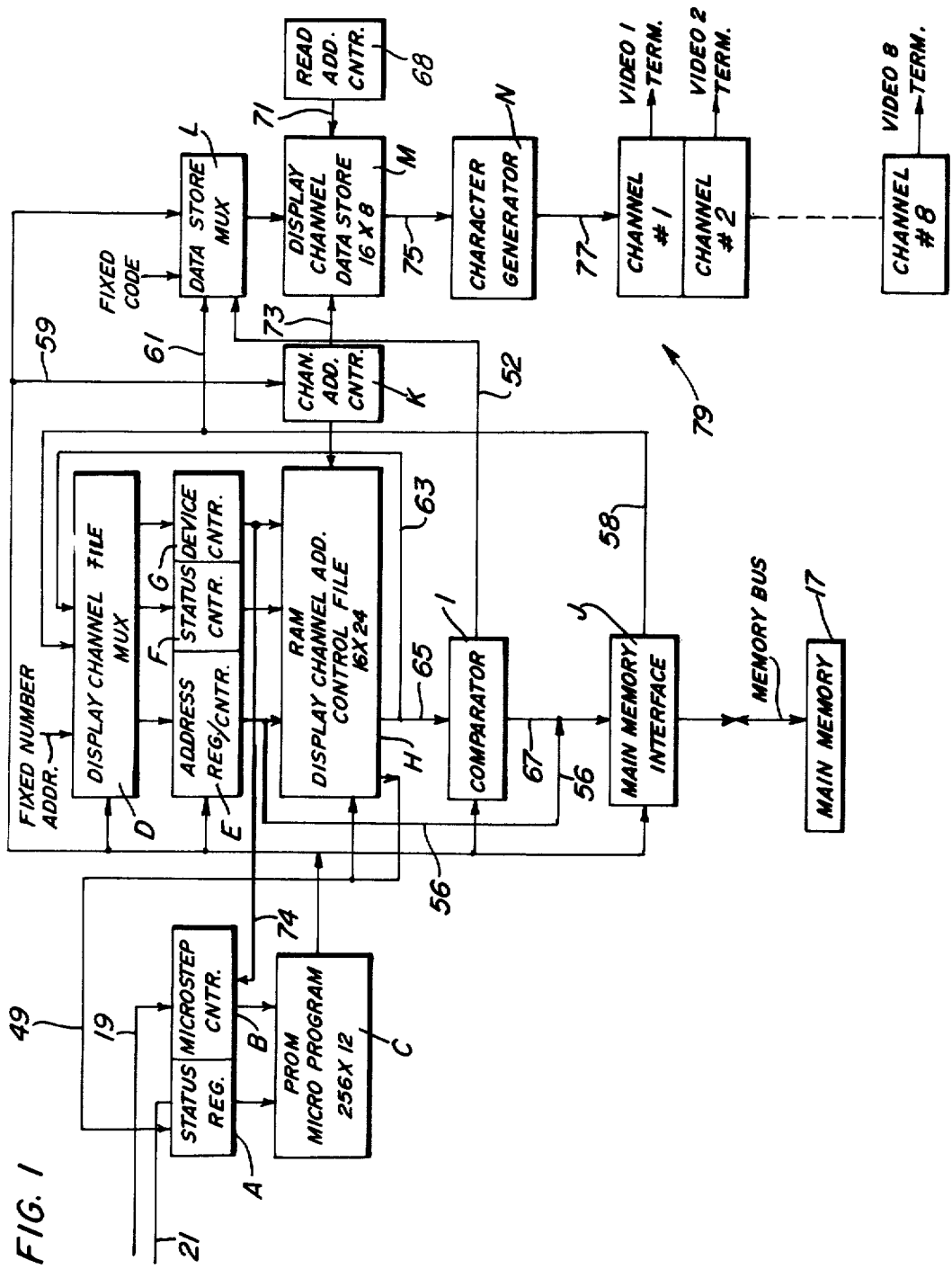
FIG. 1 is a block diagram of the present data display subsystem.

Referring to the figures, and more particularly FIG. 1 thereof, a block diagram of the present data display subsystem is illustrated.

The data display subsystem (DDS) microprogram is divided into a number of basic subroutines which are stored in a 256 × 12 PROM. Each subroutine is made up of two to six microsteps. The program is addressed from two registers: a Status or subroutine Register and a Microstep Register.

The basic micro subroutines are respectively referred to by a separate status number. These are listed below, with a brief description of the function of each subroutine, alongside.

| Micro Subroutine (status) | Function |
| --- | --- |
| 0 | Fetch the upper 8 bits of the display starting address from a table in Main Memory and enter it into a RAM to be referred to hereinafter as a Display Channel Control File. |
| 1 | Fetch the lower 8 bits of the display starting address from the table in Main Memory. |
| 2 | Fetch the upper 8 bits of an Entry Marker address from the Main Memory table. |
| 3 | Fetch the lower 8 bits of the Entry Marker address from the Main Memory table. |
| 4 | Fetch a character signifying the mode of system operation and enter it into storage registers hereinafter referred to as the Display Channel Data Store. |
| 5 | Fetch a regular data character for display. |
| 6 | Spare |
| 7 | Spare |
| 8 | Increment subroutine (status) count. |
| 9 | Increment subroutine (status) count. |
| 10 | Increment subroutine (status) count. |
| 11 | Increment subroutine (status) count. |
| 12 | Increment subroutine (status) count. |
| 13 | Fetch the next data character for display. |
| 14 | Spare |
| 15 | Spare |

Subroutines 0–4 will be performed during a frame retrace time of the CRT or new segment time during line retrace time of the CRT and subroutines 8–12 during line retrace times of the screen. The term segment is explained in the following paragraph.

The DDS is divided into eight display channels. Each channel provides control and data to a CRT. The amount of data that a channel will handle is determined by a designed CRT refresh rate. For a screen refresh rate of 50 Hz, a channel can handle 1098 characters. As shown in FIG. 1, a preferred embodiment of the present invention typically includes eight video channels, generally indicated by reference numeral 79. Although each of the channels is illustrated as providing a single output to a single video terminal, it is to be understood that up to four video terminals may be connected to the output of each channel. Thus, up to 32 CRT displays may be accommodated in a preferred embodiment of the present system. Each display typically contains up to 24 lines of data. However, the display data need not be contiguous. That is to say, that there may be up to four groups of data displayed on a single CRT screen. These groups are referred to as segments.

The majority of blocks illustrated in FIG. 1 utilize commercially available IC chips, such as provided by INTEL Corporation of Santa Clara, Calif., and Texas Instruments (TI) of Texas.

In FIG. 1, initially, status register A and microstep counter B, which may be Texas Instruments (TI) Model 74163 chips are reset to zero. The outputs from the register and the counter input to a programmable read-only memory C (PROM) which may be identified by three INTEL 3601 256 × 4 chips. In actuality, three of the PROM's C are interconnected to form a 256 × 12 capacity unit. Initially, the output from the PROM C gates the input to the display channel file MUX D which is of the type identified as a TI 74153 chip.

A fixed number address is suitably provided to the first input of MUX D so that a subsequent address register E is provided with 16 bits of address information. The register E may also be a chip of the type manufactured by TI and indicated by 74163. A status counter F of the same type chip as register E is originally set to zero and remains in this state while the register E is set to the first address. A device counter (TI 74163) is likewise set to zero during this time period. The indicated output 56 from the address register E provides the address of a requested location to the main memory interface J. The requested address will be the beginning of a control table for data that is associated with a first output data channel, to be discussed hereinafter. The table includes the addresses in a separate main memory 17 where the actual data, to be displayed, may be found. In effect, indirect addressing of data is utilized. In addition, this table includes the address where an entry marker or cursor, for a particular channel, is located.

Figure 2B:
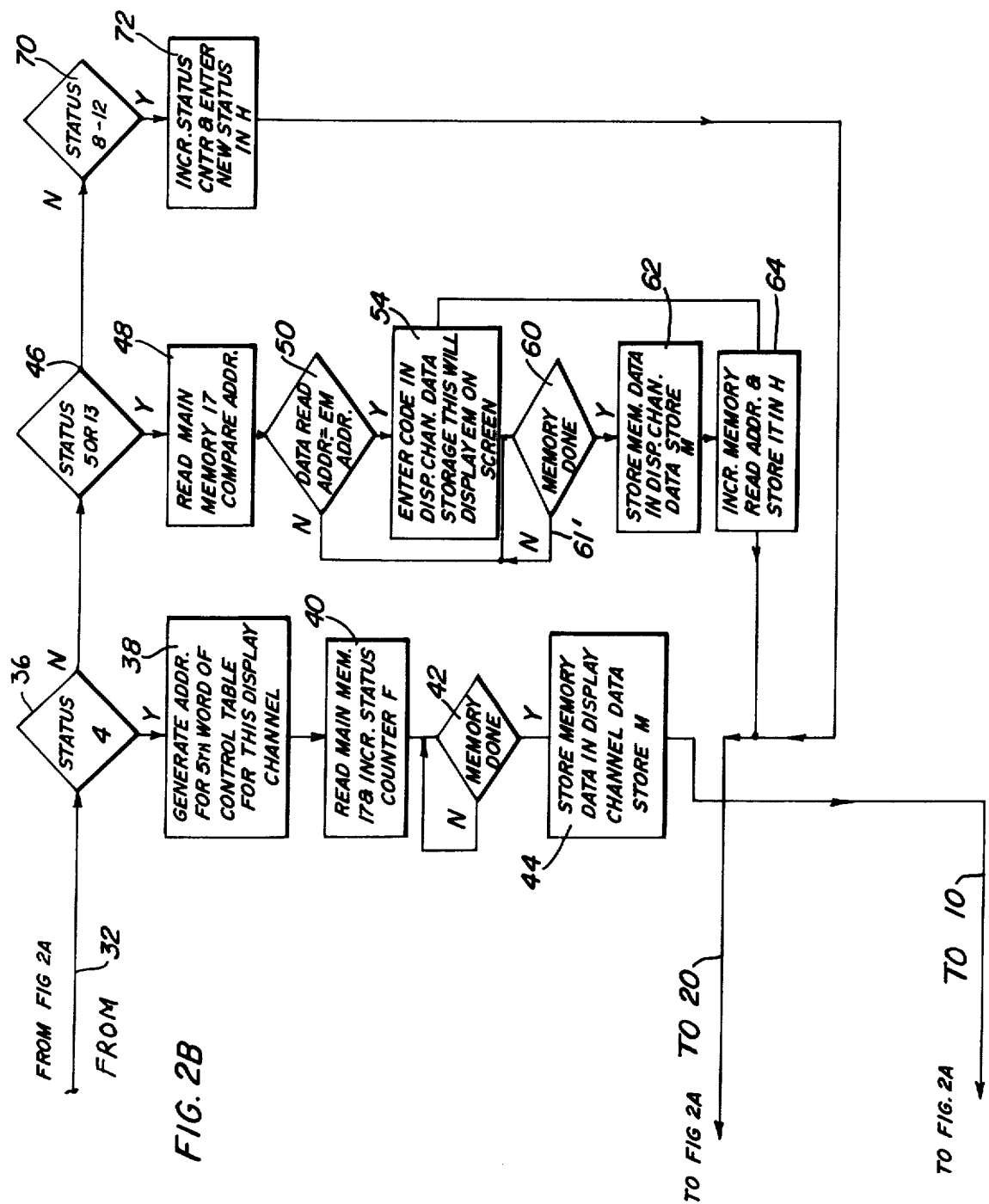

In order to better appreciate the step-by-step operation of the present invention, a logic flow diagram of the data display subsystem is provided in FIGS. 2A and 2B. The indirect addressing scheme discussed hereinabove, requires the microroutine of the PROM C (FIG. 1) to establish a first subroutine referred to as the status 0 subroutine. The remaining sequential subroutines, as shown in FIGS. 2A and 2B, will be referred to as status 1-status 13. When the first subroutine starts at status 0, designated by step 10, the first following microstep, developing generation of an address where the look-up table begins, is designated by step 12. Actually, only a first word is generated which is 8 bits long and represents the upper 8 bits of the display starting address. As will become more apparent hereinafter, it requires the micro subroutines of status 0 and the subsequent status 1 to generate the most significant and least significant 8 bits of the display starting address to be found in a table in main memory.

Referring to status 0 at reference numeral 10, a decisional step is executed as to whether indeed the microroutine is at status 0. If the answer is affirmative, as we assume at the initiation of operation, an intermediate decisional step 11 intervenes to determine whether the microstep counter B is equal to 0. If it is, as it would be in the assumed instance of operation initiation, the micro subroutine branches to step 12. It is to be understood that while viewing FIGS. 2A, 2B, all the steps vertically below the decisional step 10 are part of a single micro subroutine, referred to as status 0.

Step 14 in FIG. 2A indicates that the next step is to read the main memory 17 (FIG. 1). Simultaneous with the reading of data from the main memory is an incrementing of the status counter F.

Next, step 16 in FIG. 2A is performed whereby an acknowledge or memory done signal is received from the main memory 17. Data presented by the memory is then passed through the main memory interface J to a second input of the MUX D, along 58, and is then entered into the address register E. As step 18 in FIG. 2A indicates, the subsequent step is to store address data, coming from main memory 17, first in address register E then in the display channel control file H. This latter-mentioned unit may be of the type provided by TI and indicated by unit number 7483. More particularly, this unit is a conventional random access memory (RAM). Simultaneous with the transfer of the address from register E to RAM H, there is a storage of the contents of status counter F and device counter G into the RAM H. The address which may be stored in the RAM is 16 bits long. However, during this portion of the program cycle, only the eight most significant bits have been stored.

Referring to FIG. 2A, the next step 20, includes an incrementing of the channel address counter K, shown in FIG. 1 via line 59. By incrementing the counter, it now contains the second count, indicative of channel 2. The reset step indicated by 24, in FIG. 2A, remains on until the addresses of all eight channels are read. Thus, after step 20, the program reiterates to step 10 whereby the status register A is quarried. The aforementioned series of microsteps will be repeated until the addresses of all channels are read. More particularly, during this reiteration, only the eight most significant bits of the addresses of each channel are read.

After step 20 of FIG. 2A has been accomplished, the status register A and the microstep counter B no longer have a reset pulse applied to them on lines 19 and 21 due to the change in step 24. Thus, the program in FIG. 2A moves along to step 22 wherein the status of the eight channels, as stored in H is determined to be 1. The program then skips through step 10 to step 26. As part of step 26, the stored status count in RAM H is stored, via line 49, in the status register A and the status counter F. As the status register A is loaded, a reset pulse is selectively applied to the microstep counter B. The PROM C now detects the new contents of the status register A and proceeds to execute the stored subroutine for this new status. This is indicated by step 28 in FIG. 2A. A new fixed number address is provided to MUX D which in turn is fed to the address register E, under the control of the PROM C. The program then branches back to step 14 to read from the main memory the second word of the control table, previously referred to, which will include the eight least significant bits of each address, associated with channels 1-8. This is accomplished in the same manner that the most significant bits were retrieved and stored. As indicated in step 14, the status counter F has incremented so that a new status, namely status 2, indicated by step 30, is in being.

The purpose of microsteps 30, 31 are to generate a third word of the control table, the eight most significant bits associated with each channel representing the entry marker or cursor address for these respective channels. When incrementing to status 3, indicated by reference numeral 32, there is generated, at step 34, the address for the fourth word of the control table, which includes the eight least significant bits of the entry marker. As status 3 sequences through step 14, the status counter F is incremented, as indicated by step 14 in FIG. 2A. The subsequent steps 16, 18, 20, 24 and 22 are repeated in this status, as they were in the previous status conditions 0, 1 and 2. As a result, status 4 is arrived at as represented by step 36 in FIG. 2B.

Steps 36 and 38 have the exclusive purpose of preparing for the generation of a flashing character on a CRT monitor, which indicates the operating mode of the CRT. For example, a flashing "T" may be generated as a first character in a display terminal to indicate to a terminal operator that the display is in a transmitting mode. Step 38 indicates that the address for a fifth word is generated, in the same manner that the previous words were generated. In a manner similar to step 14, step 40 accomplishes the reading of main memory 17 and the incrementing of status counter F. The subsequent step 42 is an acknowledge step similar to step 16, previously discussed. Step 44 accomplishes the storage of read memory data through interface J, line 58 then line 61 to the display channel data store M. The MUX L is enabled by a second illustrated input, coming from PROM C. From here, the program jumps to status 5, indicated by reference numeral 46. Of course, it is to be appreciated that step 46 is promptly arrived at by virtue of the decisional steps, in the negative, for steps 10, 26, 30, 32, and 36. Thus far, the contents of the data storage register M is the character to be flashingly displayed as a mode indicator.

At this status 5, the actual data will be fetched for display.

It is to be noted that each time step 22 is completed, the contents of RAM H, as addressed by the channel address counter K causes a transfer of data from the RAM H to the address register E, status counter F, and device counter G, through line 63. Simultaneously, through connecting line 49 in FIG. 1, this information is transferred to the status register A, which will contain the same transmit information as is contained in status counter F. It is to be understood that counters E, F and G can only include the complete information for a particular channel at one particular time, as dictated by the channel address counter K.

Referring to FIG. 2B, step 48 causes the main memory 17 to be read, as part of status condition 5. The information read will be the first character, of the first line, for the display. At the same time that the main memory is being read, the comparator I, of the type manufactured by TI and known as chip 7485, compares the address of the entry marker derived at line 65 with the address located in the address counter E derived at line 67. This is signified by step 50 in the diagram of FIG. 2B. If a positive result occurs, an output from comparator I, along lead 52, provides an input to the MUX L (TI 74157), which then permits passage of a fixed code, indicative of a cursor character, through the MUX into the data storage register M (TI 74170). This is signified by step 54 in FIG. 2B. If a negative result occurs from comparator I, the address stored in E is transferred to the main memory 17, through line 56 and through interface J. Data in the requested address is then fetched from memory 17 and is transferred to MUX L along line 58. As the data is being fetched, an acknowledge signal or "memory done" is received by the interface J, as signified by step 60. Lead 61' indicates that a looping operation continues until the acknowledge signal is received. Assuming that no comparison is made by comparator I, the data stored in MUX L is transferred to the data storage register M. This is signified by step 62 in the flow diagram of FIG. 2B. It will be recalled in step 44, that the mode character is stored in the storage register M. The mode character is displayed before the first character is displayed. More particularly, this occurs while the data for the first character is being fetched from memory 17.

Step 64 in FIG. 2B indicates that while each character is being fetched from memory, the address register E, now serving as a counter, is incremented by one, as long as the status = 5. After the incrementing operation is completed, the incremented address and current status counter F and device counter G contents are transferred to RAM H.

At the completion of step 64, the program jumps along path 66 to step 20 which causes an incremental change in the channel address counter K whereby line 73 determines that a character of the next channel is to be displayed.

Each character of data is stored in register M. The display channel data storage register M includes 16 registers, each having eight bit capacity. Each channel is assigned two registers storing two adjacent display characters. While one character is displayed, the other is stored.

The read address counter 68 (TI 74163) is an odd, even counter which provides either an odd or even binary input 71 to the data register M. For example, if the read address counter 68 is set to an odd binary output, the odd numbered stores in the sixteen words will be read out, which corresponds with the odd number characters for channels 1-8. When the counter 68 changes its state to an even output, the even numbered characters are read out for each channel. As each character is read out from the storage register M, along line 75, a character generator N (TI 3601) converts the binary coded input to a 5 × 7 dot matrix, in a conventional fashion.

Counter 68 accomplishes two types of counts. First, it alternates between binary zero and binary 1, for selecting odd or even characters to be displayed. In addition, the counter 68 includes a 0-7 counter for establishing which of the channels 1-8 are to become connected to the output from character generator N, at a particular time.

Character generator N is a PROM which actually performs two functions. First, it encodes data characters at 77 to a dot matrix format for use by the eight channels of conventional video logic 79. Secondly, it recognizes other codes, indicative of control functions, which are part of the data stored in the memory. For example, certain data may be tagged for line retrace. As such, the character data will be encoded in a dot matrix format while the line retrace control function will also be encoded, but recognized as a control function by channel video logic. The video logic would be similar to the type incorporated in display terminals, such as the commercially available BUNKER RAMO Series 2200 equipment.

The status 5, indicated by step 46 in FIG. 2B will continue fetching data from memory and displaying this data until one of the following codes in the data is decoded:

end of line
end of sgement
end of screen.

If any of these codes are detected by the main memory interface J, status 5 is terminated.

If an end of line code is generated, the program will jump to step 70, as shown in FIG. 2B, to assume status 8. During step 72 the microprogram causes the status counter F to increment by one and this updated status count is stored in RAM H. The program then advances to path 66 for incrementing the channel address register in step 20. The status incrementing occurs for six status periods, namely status 8-12. The function of this is to provide sufficient time, namely the time required to generate six characters, to insure line retrace thereby resulting in the display of a subsequent line on a CRT display. As a result of step 72, the status counter F is incremented thereby incrementing the program to status 13 which has been indicated by step 46, in FIG. 2B, and which is identical to the steps executed during status 5, as previously discussed.

If an end of segment signal is detected by the memory interface J, the status counter F is reset to zero, the device counter G is incremented by one and the new contents of counters E, F and G are transferred to RAM H. The program will then begin once again with step 10, in FIG. 2A.

If an end of screen code is generated, the status counter F is reset to zero and the device counter G is incremented by one. Thereafter, the contents of counters E, F and G are transferred to RAM H. When the end of frame character comes from memory 17 and is stored in register M, the character generator N recognizes this and encodes it to a frame retrace code which is handled by the video logic in a conventional fashion. Inasmuch as this preferred embodiment is directed to the utilization of four CRT's for each channel, the device counter G will increment to a maximum count of 4. When the device counter G reaches the count of 4 and the most significant bit of the microstep counter B is set to a binary one, the output from the counter B addresses the PROM C to effect an idle routine as indicated by 74' in FIG. 2A. The purpose of this is to ensure that the refresh rate of the screen remains constant. The only positive step that the program will undertake during this idle routine is to change the channel address counter K so that the next channel can be executed. In executing the idle routine, a null is entered into display channel data store M and the status, device count and address are fetched from the display channel control file H for the next channel.

The microstep counter B is automatically incremented by a clock (not shown) of the system. However, there are two conditions when incrementing of the microstep counter is inhibited. The first is when the main memory is being accessed. The second condition is when the device counter G has reached a maximum count of 4, in which case the lead 74 in FIG. 1 becomes activated to inhibit the microstep counter B.

The main memory interface J is comprised of conventional CRT display line drivers and line receivers that connect the memory bus to the logic of the subsystem. Further, conventional decoding logic is including in the interface block to decode the occurrence of the three functional conditions listed above, namely, end of line, end of segment, and end of screen.

As previously mentioned, the PROM C stores 256 words, each word having a 12 bit format. Each of the 12 bits of each word is utilized to control the various microroutine steps previously discussed. The following table represents a tabulation of the bit positions of a PROM word as they are related to the various functions that they control:

| Bits Position | Control Function |
|---|---|
| 1–2 | Permit four control states for MUX D. |
| 3 | Writing data from RAM H from registers E, F, and G. |
| 4 | Loading file registers E. F. G from MUX D. |
| 5 | Enabling comparator I. |
| 6 | Reading the main memory 17 through interface J. |
| 7 | Waiting for the transferral of data through the interface J to be done. |
| 8 | Channel address conter K — least significant bit. |
| 9 | Write data into storage registers M. |
| 10 | Increment the channel address counter K. |
| 11 | Increment status counter F. |
| 12 | Increment the address counter E. |

By virtue of the foregoing description, it will be appreciated that the system is designed as a microcontroller. This is due to the fact that a stored control program determines and controls all logic operations. This design approach has numerous advantages over the standard control logic design in that it greatly reduces the amount of logic required, enables faster and easier debugging and lends itself to changes.

It should be understood that the invention is not limited to the exact details of construction shown and described herein for obvious modifications will occur to persons skilled in the art.

What is claimed as new and desired to be secured by Letters Patent of the United States is:

1. A data display system comprising:
   (a) a programmable read-out memory (PROM) for storing a fixed microroutine for governing logic operation of the system;
   (b) first control means enabled by the PROM during an initial subroutine (status), for transferring a fixed number address into an address register;
   (c) a memory interface means for communicating with a main memory;
   (d) means connecting an address register output to the interface means for reading, from a main memory, the contents of the fixed number address, the contents being a character data starting address;
   (e) means connecting the output of the interface means to the first control means, for transferring the starting address and an incremented status, through the address register and a status counter, to an address control file means, for storing the starting address and the incremented status therein;
   (f) means for transferring the stored incremented status from the file means to a status register;
   (g) means connecting the status register to the PROM for the addressing thereof;
   (h) the first control means being responsive to the PROM for transferring therethrough, the stored starting address from the address control file to the address register;
   (i) second control means responsive to the PROM for transferring character data, from the starting address in the main memory, through the interface means, to display data store means, after the completion of transferral in (h);
   (j) means connecting the output of the data store means to character generating means for providing character data information, channel by channel, for a video display.

2. The subject matter set forth in claim 1 wherein the PROM is addressed by the status register, to actuate the first control means, for transferring a further fixed address into the address register during a separate status thereby causing writing from the interface means, into the control file means, the starting address of entry marker data;

comparator means connected between the control file means and the address register when the starting address is stored as in (h), for comparing the starting addresses of the character data and the entry marker; and means connecting the comparator means output to the second control means for causing generation of an entry character instead of a data character, if a positive comparison results.

3. The subject matter set forth in claim 1 wherein the PROM is addressed by the status register to actuate the first control means to transfer a next fixed address into the address register during a separate status thereby causing writing from the interface means into the control file, the address of a mode character;

the second control means responsive to the PROM for transferring a mode character from the mode character address in the main memory, through the interface means, to display data store means, after the mode character address is transferred from the control file to the address register.

4. The subject matter set forth in claim 3 and further wherein the PROM is addressed by the status register, to actuate the first control means, for transferring a further fixed address into the address register during a separate status thereby causing writing from the interface means, into the control file means, the starting address of entry marker data;

comparator means connected between the control file means and the address register when the starting address is stored as in (h), for comparing the starting addresses of the character data and the entry marker; and means connecting the comparator means output to the second control means for causing generation of an entry character instead of a data character, if a positive comparison results.

5. A data display system capable of accommodating a plurality of video channels, the system comprising:

(a) a programmable read-out memory (PROM) for storing a fixed microroutine for governing logic operation of the system;

(b) first control means enabled by the PROM during an initial subroutine (status), for transferring fixed number addresses for respective channels, into an address register;

(c) a memory interface means for communicating with a main memory;

(d) means connecting an address register output to the interface means for reading from a main memory the contents of the respective fixed number addresses, for respective channels, the contents being the character data starting addresses of the respective channels;

(e) means connecting the output of the interface means to the first control means for transferring the starting addresses of respective channels and incremented status conditions of respective channels through the address register and a status counter to an address control file means for storing the starting addresses and the incremented status conditions of the respective channels, therein;

(f) means for sequentially transferring the stored incremented status of respective channels from the file means to a status register;

(g) means connecting the status register to the PROM for the addressing thereof;

(h) the first control means being responsive to the PROM for transferring therethrough, stored starting addresses of respective channels from the address control file means to the address register;

(i) second control means responsive to the PROM for sequentially transferring character data, from the starting addresses of respective channels in the main memory, through the interface means, to display channel data store means, after the completion of transferral in (h);

(j) means connecting the output of the data store means to character generating means for providing character data information channel by channel, for a video display.

6. The subject matter of claim 5 wherein the PROM is addressed by the status register to actuate the first control means to transfer further fixed addresses of respective channels into the address register during a separate status thereby causing writing from the interface means, into the control file means, the starting addresses of entry marker data for respective channels;

comparator means connected between the control file means and the address register when the starting address of a respective channel is stored as in (h) for comparing the starting address of the character data and the entry marker of respective channels; and means connecting the comparator means output to the second control means for causing generation of an entry marker character instead of a data character, if a positive comparison results for a particular channel.

7. The subject matter set forth in claim 5 wherein the PROM is addressed by the status register to actuate the first control means to sequentially transfer next fixed addresses of respective channels into the address register during a separate status thereby causing writing from the interface means into the control file means, the addresses of mode characters of respective channels;

the second control means responsive to the PROM for sequentially transferring mode characters from the mode character addresses in the main memory, through the interface means, after the mode character addresses are transferred from the control file to the address register.

8. The subject matter set forth in claim 7 and further wherein the PROM is addressed by the status register to actuate the first control means to transfer further fixed addresses of respective channels into the address register during a separate status thereby causing writing from the interface means, into the control file means, the starting addresses of entry marker data for respective channels;

comparator means connected between the control file means and the address register when the starting address of a respective channel is stored as in (h) for comparing the starting address of the character data and the entry marker of respective channels; and means connecting the comparator means output to the second control means for causing generation of an entry marker character instead of a data character, if a positive comparison results for a particular channel.

9. The subject matter set forth in claim 5 together with counter means connected to an input of the control file means, and incremented when the means set forth in (e) has completed its operation, incrementing of the counter causing addressing of the control file means to respectively operate upon starting addresses of all channels before a second status is assumed.

10. The subject matter set forth in claim 6 together with counter means connected to an input of the control file means, and incremented when the means set forth in (e) has completed its operation, incrementing of the counter causing addressing of the control file means to respectively operate upon starting addresses of all channels before the individual status conditions.

11. A system for controlling the flow of displayable stored data comprising:
   a programmable read-only memory (PROM) storing a microroutine for controlling logic operation of the system;
   control file means enabled by the PROM for storing starting addresses derived from a main memory, via interface means, where data is stored;
   address register means enabled by the PROM and connected to the control file means for retrieving, from the file means, a starting address;
   means connecting an output of the address register means to the main memory interface means for accessing the starting address from the main memory therethrough, in response to enablement by the PROM;
   means connecting an output of the interface means to data store means, the interface being enabled by the PROM to transfer data from a selected address in the memory to the data store means; and
   means connected to the data store means output for reading out data therefrom.

12. The subject matter set forth in claim 11 together with means connected to the output of the data store means for generating a preselected character format signal therefrom.

13. The subject matter set forth in claim 12 together with means for converting the format signal into a video signal utilizable by a cathode ray tube for character display.

14. The subject matter set forth in claim 11 wherein the starting address in the control file means are respectively associated with a plurality of channels, the system further comprising:
   channel counter means enabled by the PROM for sequentially addressing the control file means for causing the starting addresses, of respective channels, to be transferred to the address register;
   whereby data is read from the main memory on a sequential channel-by-channel basis.

15. The subject matter set forth in claim 11 together with comparator means connected between outputs from the control file and the interface means for comparing the starting addresses of first and second types of data, a positive comparison causing the reading from the data store means, of the second type of data, in lieu of the first type.

16. The subject matter set forth in claim 12 together with comparator means connected between outputs from the control file and the interface means for comparing the starting addresses of character data and entry marker data, a positive comparison causing the reading from the data store means, of entry marker data, in lieu of character data, thus causing the generation of an entry marker character in lieu of a data character.

17. The subject matter set forth in claim 11 wherein the PROM increments the address register for reading out data from the main memory that is located in addresses subsequent to the starting address.

18. The subject matter set forth in claim 13 wherein the PROM increments the address register for reading out data from the main memory that is located in addresses subsequent to the starting address.

* * * * *